(12) United States Patent
Dubinins et al.

(10) Patent No.: US 6,981,471 B1
(45) Date of Patent: Jan. 3, 2006

(54) COMBINATION SQUEEZE TOY AND CHEW TOY

(76) Inventors: Dmitrijs V. Dubinins, 9647 Deerhorn Ct. Unit #151, Parker, CO (US) 80134; Kenneth A. Jellico, 11908 W. Cooper Dr., Littleton, CO (US) 80127

( * ) Notice: Subject to any disclaimer, the term of this patent is extended or adjusted under 35 U.S.C. 154(b) by 0 days.

(21) Appl. No.: 10/249,850

(22) Filed: May 12, 2003

(51) Int. Cl.
*A01K 29/00* (2006.01)

(52) U.S. Cl. .................. 119/710; 119/709; 119/711
(58) Field of Classification Search ............... 119/707, 119/708, 709, 710, 711
See application file for complete search history.

(56) References Cited

U.S. PATENT DOCUMENTS

| | | | | |
|---|---|---|---|---|
| 3,830,202 A | * | 8/1974 | Garrison | 119/709 |
| 4,907,537 A | * | 3/1990 | Shirk | 119/707 |
| 5,799,616 A | * | 9/1998 | McClung, III | 119/709 |
| 5,865,146 A | * | 2/1999 | Markham | 119/707 |
| 5,947,061 A | * | 9/1999 | Markham et al. | 119/710 |
| 6,186,096 B1 | * | 2/2001 | Miller | 119/709 |
| 6,484,671 B2 | * | 11/2002 | Herrenbruck | 119/707 |
| 6,584,938 B2 | * | 7/2003 | Sherrill et al. | 119/710 |

* cited by examiner

*Primary Examiner*—Charles T. Jordan
*Assistant Examiner*—T. Nguyen

(57) ABSTRACT

This invention features a combination squeeze toy and chew toy for an animal, such as a dog, comprising an assemblage of a first formed material and second formed material, having different material properties. Said first material forming article body portion, hereinafter named as "toy body portion," comprised of resiliently deformable, soft elastomeric latex, vinyl or like material. Said second material forming article chew portion, hereinafter known as "toy chewable portion" comprised of substantially rigid or semi rigid thermal plastic polymer, nylon or like material. The toy body portion is hollow, having interior space and preferably spherical in shape. The toy chewable portion is substantially solid in form and preferably cylindrical in shape. In the preferred embodiment of this invention, said toy body portion has said toy chewable portion located centrally through said toy body portion and protruding through each side thereof.

18 Claims, 4 Drawing Sheets

COMBINATION SQUEEZE TOY AND CHEW TOY

BACKGROUND OF INVENTION

This invention generally relates to chew toys for pets that are fabricated from rigid or semi-rigid synthetic materials (i.e. thermal plastic polymer, nylon, or like material) and that are solid formed and have a resilient elasticity particularly adapted for biting and chewing by an animal, such as a dog. Secondly, this invention relates to squeeze toys for pets that are hollow formed having interior space and that are fabricated from soft, elastomeric materials (i.e. latex, vinyl, or like material) and that are resiliently deformable and have negligible resistance.

Mammals use their mouths to explore and chew on objects throughout their lives as a normal, genetically driven behavior. Mastication provides a beneficial and therapeutic effect on the teeth and gums of an animal, such as a dog, and additionally offers stimuli necessary to reduce boredom and anxiety common with household pets. When no alternatives are made available, an animal will have a likely desire to chew on objects not designed for this identifiable purpose, such as furniture or shoes. Pet owners have thus long recognized the necessity and effectiveness of chew toys to provide a beneficial and therapeutic effect for their pet's teeth and gums, and as a means of preventing their pets from chewing on non-chewable and potentially valuable household objects.

U.S. Pat No. 4,513,014 discloses such benefits derived from a chew toy for an animal, in as a super-tough solid formed polyurethane chew bone for an animal.

U.S. Pat No. 4,802,444 discloses another such chew toy formed of synthetic materials designated for use as a dental hygienic pet toy for dental prophylaxis on the teeth of a dog or other carnivore.

It is further known that animals, particularly dogs as well as their owners enjoy the dynamic interaction, sensory attraction and playability derived from soft, resiliently deformable squeeze toys comprising of substantially hollow formed elastomeric materials having a negligible resistance that pets enjoy gripping and squeezing. These squeeze toys provide a compel attraction to an animal, whereby an animal will frequent the toy on its own initiative more often, thereby improve its physical condition, health, and mental alertness through its own efforts.

Chew toys fabricated from substantially solid formed plastics, nylon or similar materials as presented in the prior-art, are of a permanent, unalterable configuration and must remain in that configuration to fulfill their specific and designated purpose of mastication or dental prophylaxis. Therefore, these chew toys cannot offer the additional multiple sensory attraction and playability derived from hollow formed squeeze toys fabricated from soft elastomeric materials.

Products for pets are widely available both for promoting dental hygiene in animals and for play. Chew articles that have a resilient elasticity particularly adapted for biting and chewing by an animal, such as a dog, can be fabricated from any number of materials ranging from rope, plastic, nylon and the like. While chew articles for pets are generally known, heretofore, it has not been known to combine as a self-contained toy, an animal chew article fabricated from substantially rigid or semi-rigid synthetic materials (i.e. thermal plastic polymer, nylon, or a like material) with a substantially hollow formed squeeze toy fabricated from resiliently deformable soft elastomeric materials (i.e. latex, vinyl, or like material).

Accordingly, it is desirable to provide a toy for a pet, which overcomes the permanent configuration of existing chew toys.

A further need exists to provide a toy for a pet, which provides a chewable resilient surface particularly adapted for biting and chewing by an animal, such as a dog.

A further need exists to provide a toy for a pet, which provides a beneficial therapeutic effect for pet's teeth and gums.

Another need exists to provide a toy for a pet that incorporates the desired handling, texture, feel and playability derived from hollow formed squeeze toys fabricated from resiliently deformable soft elastomeric materials having flexibility and negligible resistance.

SUMMARY OF INVENTION

The present invention relates generally to new and novel improvements relating to pet toys. Briefly described, the toy embodying aspect of this invention features a combination squeeze toy and chew toy for an animal, such as a dog, comprising an assemblage of a first formed material and a second formed material, having different material properties. Said first material forming article body portion, herein named as "toy body portion," is substantially comprised of resiliently deformable, soft elastomeric latex, vinyl or like material. Said second material forming article chew portion, herein known as "toy chewable portion" is comprised of substantially rigid or semi rigid thermal plastic polymer, nylon or like material. The toy body portion is hollow, having interior space and preferably spherical in shape. The toy chewable portion is of substantially solid form and preferably cylindrical in shape. In the preferred embodiment of this invention, said toy body portion has said toy chewable portion located centrally through said toy body portion and protruding through each side thereof.

It is thus the object of the present invention to provide a combination squeeze toy and chew toy for an animal, such as a dog. This addresses the aforementioned limitations of the prior art, and combines as a self-contained toy, the beneficial therapeutic effects for a pet's teeth and gums with the additional sensory attractors and playability derived from the soft, resiliently deformable and hollow squeeze toy.

It is another object of the present invention to provide a combination squeeze toy and chew toy for an animal, such as a dog, which combines the playful benefits of a squeeze toy and the therapeutic benefits of a chew toy in a configuration that is both highly durable and economical to manufacture.

These and other objects and advantages of the present invention will become readily apparent from the following detailed description taken in conjunction with the accompanying drawings.

BRIEF DESCRIPTION OF DRAWINGS

Other objects, features and advantages will occur to those skilled in the art from the following description of the preferred embodiment, and the accompanying drawings, in which.

Although specific features of this invention are shown in some drawings and not others, this is for convenience only as each feature may be combined with any or all of the other features in accordance with the invention.

DETAILED DESCRIPTION

Figure 1:
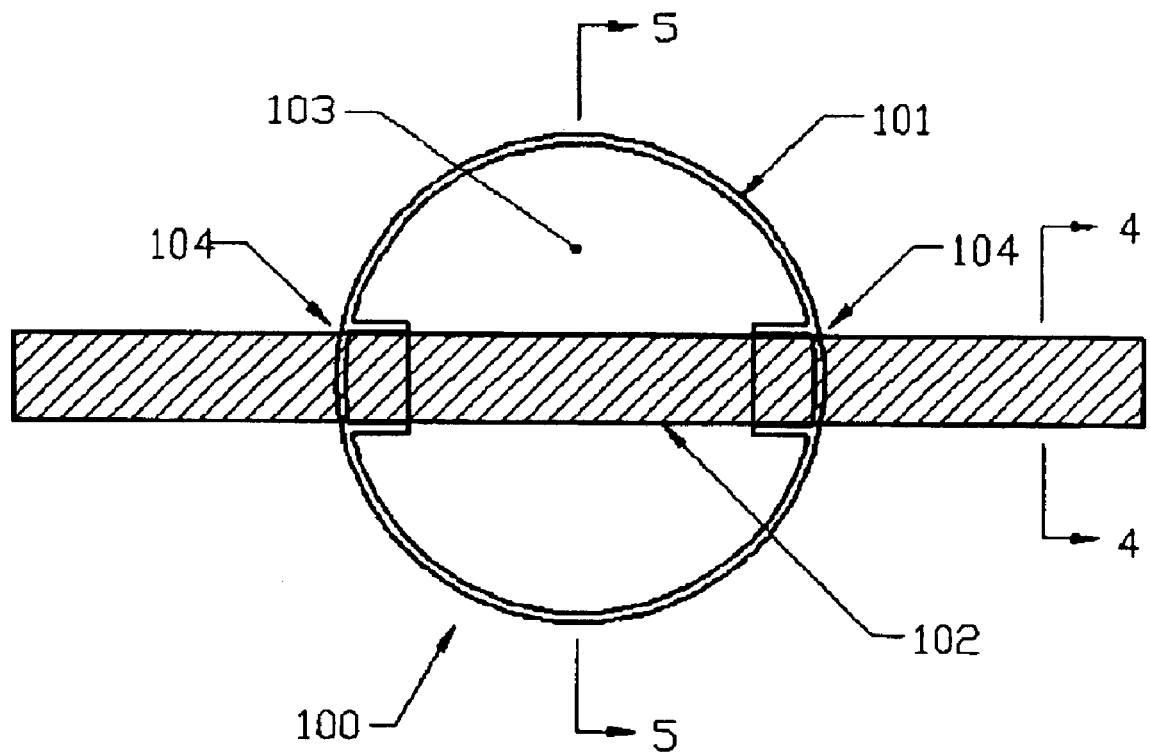
FIG. 1 is a partial sectional side view of a combination squeeze toy and chew toy, formed in accordance with a first embodiment of this invention.

Referring now to the drawings, FIG. 1 is a side view of a combination squeeze toy and chew toy 100 according to aspects of the present invention, that is suitable for use in combining and providing as a self contained toy, a chewable resilient surface particularly adapted for biting and chewing by an animal, such as a dog, with the additional sensory attractions and playability derived from the soft, resiliently deformable and hollow squeeze toy fabricated from soft elastomeric materials having flexibility and negligible resistance that animals, such as dogs, enjoy gripping and squeezing. As shown in FIG. 1, the toy body portion 101 preferably is (although not necessarily) comprised of a ball having a generally spherical shape and hollow, having an interior space 103. Toy body portion 101 is elastomeric and preferably manufactured using readily available fabrication processes and fabricated from latex material. Toy body portion 101 is advantageously molded to approximately 3 mm in thickness and to a hardness in the range of 70 to 90, preferably 80 to 90, most preferable 85 Shore A hardness (Scale Shore A).

As can be appreciated from FIG. 1, toy 100 includes toy chewable portion 102 that is preferably (although not necessarily) cylindrical in shape and constructed of highly rigid materials such as thermal plastic polymer and/or nylon resin to support the hollow and elastomeric toy body portion 101. Thus, the rigidity of the toy chewable portion 102 provides overall structure, support, and durability for the elastomeric toy body portion 101. Said toy body portion 101 has said toy chewable portion 102 located centrally through said toy body portion 101 and protruding through each side 104 thereof. Toy chewable portion 102 is advantageously molded to have hardness in the range of 70 to 90, preferably 74 to 82, most preferable 78 Shore D hardness (Scale Shore D). In the preferred embodiment of this invention, scent and flavor additives such as cheese, beef, pork, and chocolate can be compounded with the material for forming toy chewable portion 102 before is molded.

Figure 2:
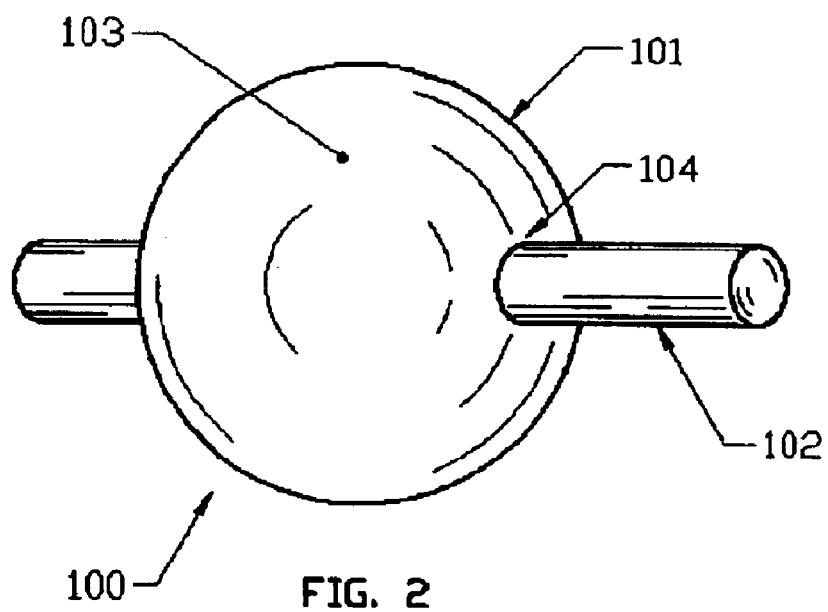
FIG. 2 is a perspective view of this same combination squeeze toy and chew toy.
Figure 3:
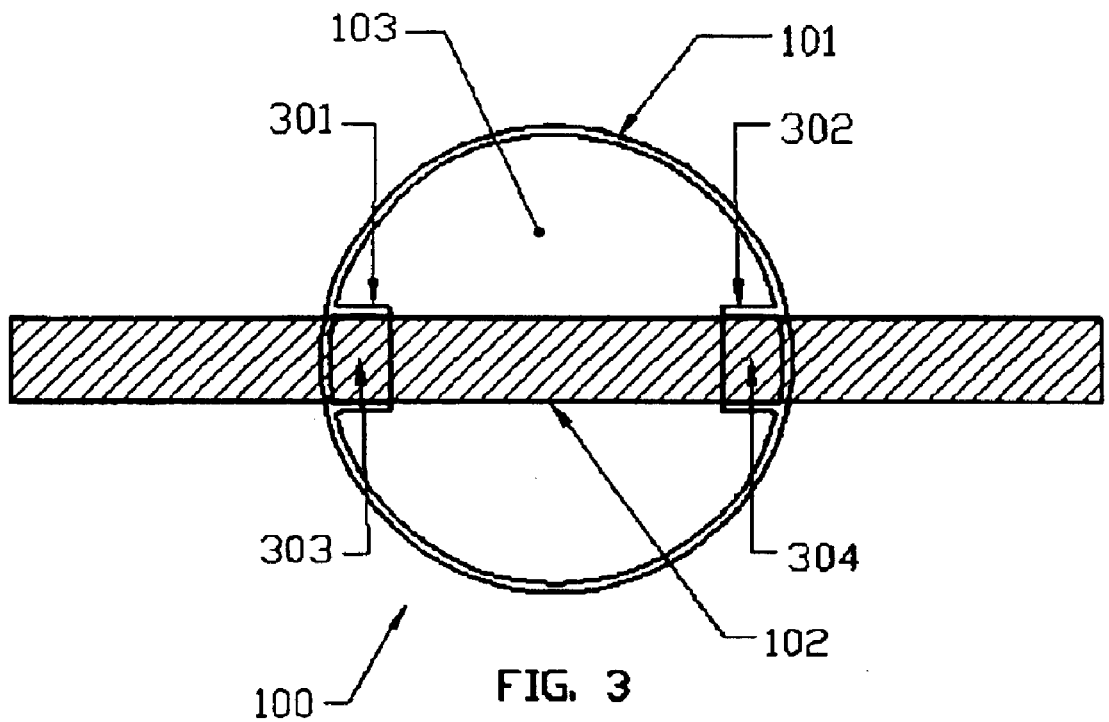
FIG. 3 is a partial sectional view of a combination squeeze toy and chew toy, which combines a flexible toy body portion with a rigid toy chewable portion and provides the manner in which these are collectively secured in the preferred embodiment of the toy of FIG. 1.

FIG. 2 is a perspective view of the combination squeeze toy and chew toy 100 of FIG. 1;

FIG. 3 illustrates the manner in which said toy body portion 101 and said toy chewable portion 102 are collectively joined to form combination squeeze toy and chew toy 100 of FIG. 1. In the preferred embodiment of the toy of this invention, tubular sleeves 301 and 302 are integrally formed in said toy body portion 101 of homogeneously molded material, to partially and circumferentially overlay in parallel the surface of toy chewable portion 102 areas 303 and 304. Tubular sleeves 301 and 302 are formed of a size and shape to very tightly fit toy chewable portion 102. To maintain toy body portion 101 onto toy chewable portion areas 301 and 302, an adhesive can be applied to tubular sleeves 301 and 302 in areas 303 and 304, to bond toy body portion 101 onto toy chewable portion 102. This also maintains positive air pressure within the interior space 103 of toy body portion 101, as desired. These features together comprise the preferred means to firmly affix and hermetically seal toy body portion 101 to toy chewable portion 102.

Figure 4:
FIG. 4 is a view in section of the toy chewable portion taken through line 4—4 of FIG. 1.

As seen in FIG. 4, the shaft of toy chewable portion 102 may have a circular cross section. Other cross sections such as oval, rectangle or an alternative indistinct shape may be used.

Figure 5:
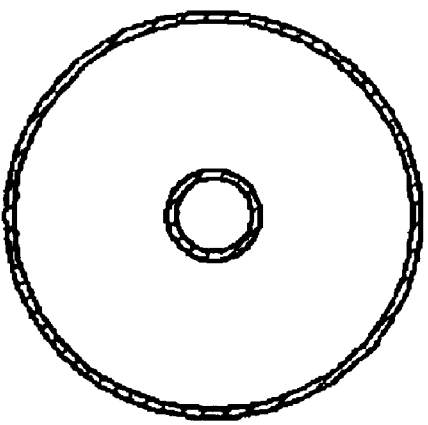
FIG. 5 is a view in section of the toy body portion taken through line 5—5 of FIG. 1.

As seen in FIG. 5, the article body of toy body portion 101 may have a circular cross section. Other cross sections such as oval, rectangle or alternative indistinct shapes may be used.

The preferred shape of the toy of this invention is best shown in FIG. 1, and is generally a "sphere" with elongated cylindrical toy chewable portion 102 located centrally through said toy body portion 101 and protruding through each side 104 thereof.

Figure 6:
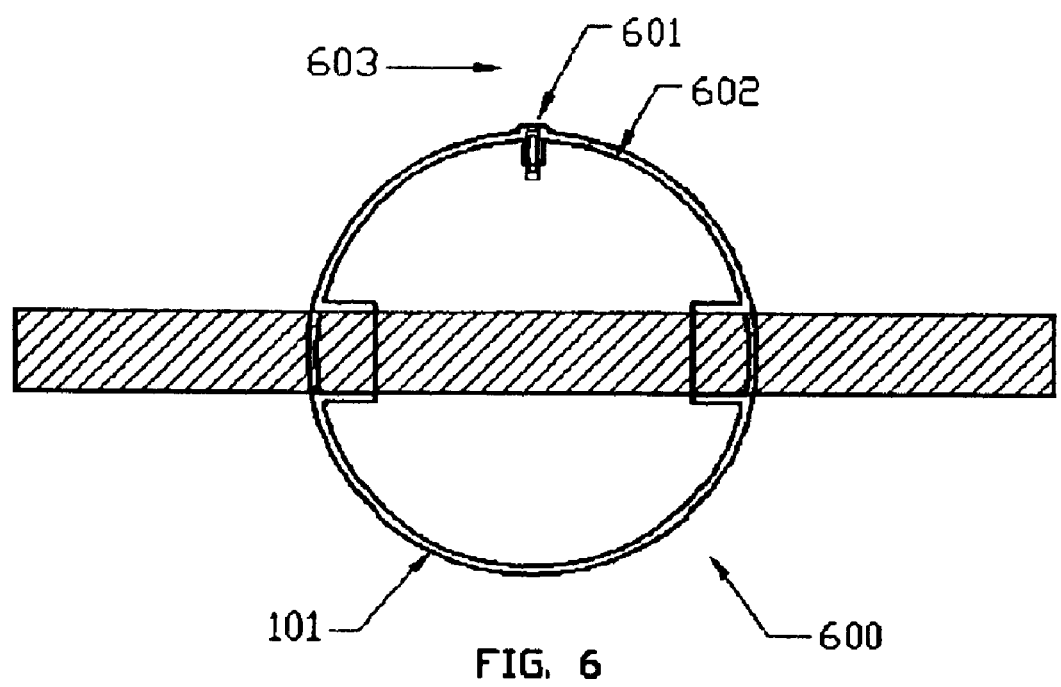
FIG. 6 is a side view of a combination squeeze toy and chew toy, formed in accordance with a second alternative embodiment of this invention, wherein a conventional "squeaker" is provided within the surrounding toy body portion, suitable for use as part of the combination squeeze toy and chew toy.

In a second alternative embodiment as shown in FIG. 6 a combination squeeze toy and chew toy 600, formed in accordance with the preferred embodiment of this invention, includes a conventional air driven "squeaker" 601 provided within the elastomeric wall 602 of the toy body 101 which exits to free air space 603 such that sound will emit by and/or when the elastomeric toy body portion(s) 101 is (are) physically compressed or expansively decompressed, affixed by means known in the art.

Figure 7:
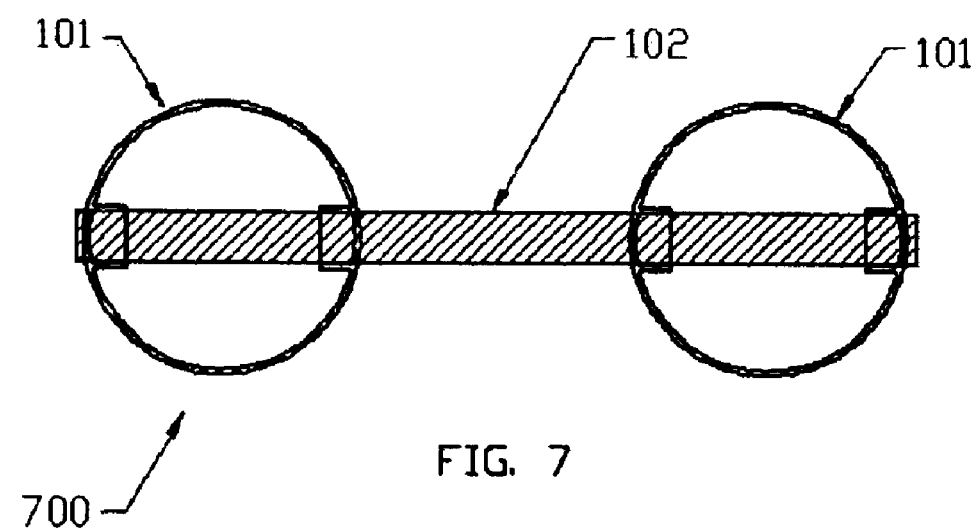
FIG. 7 is a side view of a combination squeeze toy and chew toy, wherein exist one or more toy body portions carried by one or more toy chewable portions, formed in accordance with a third alternative embodiment of this invention.

In a third alternative embodiment of a combination squeeze toy and chew toy 700, formed in accordance with the preferred embodiment of this invention, therein exist one or more toy body portions 101 carried by one or more toy chewable portions 102 as shown in FIG. 7.

Figure 8:
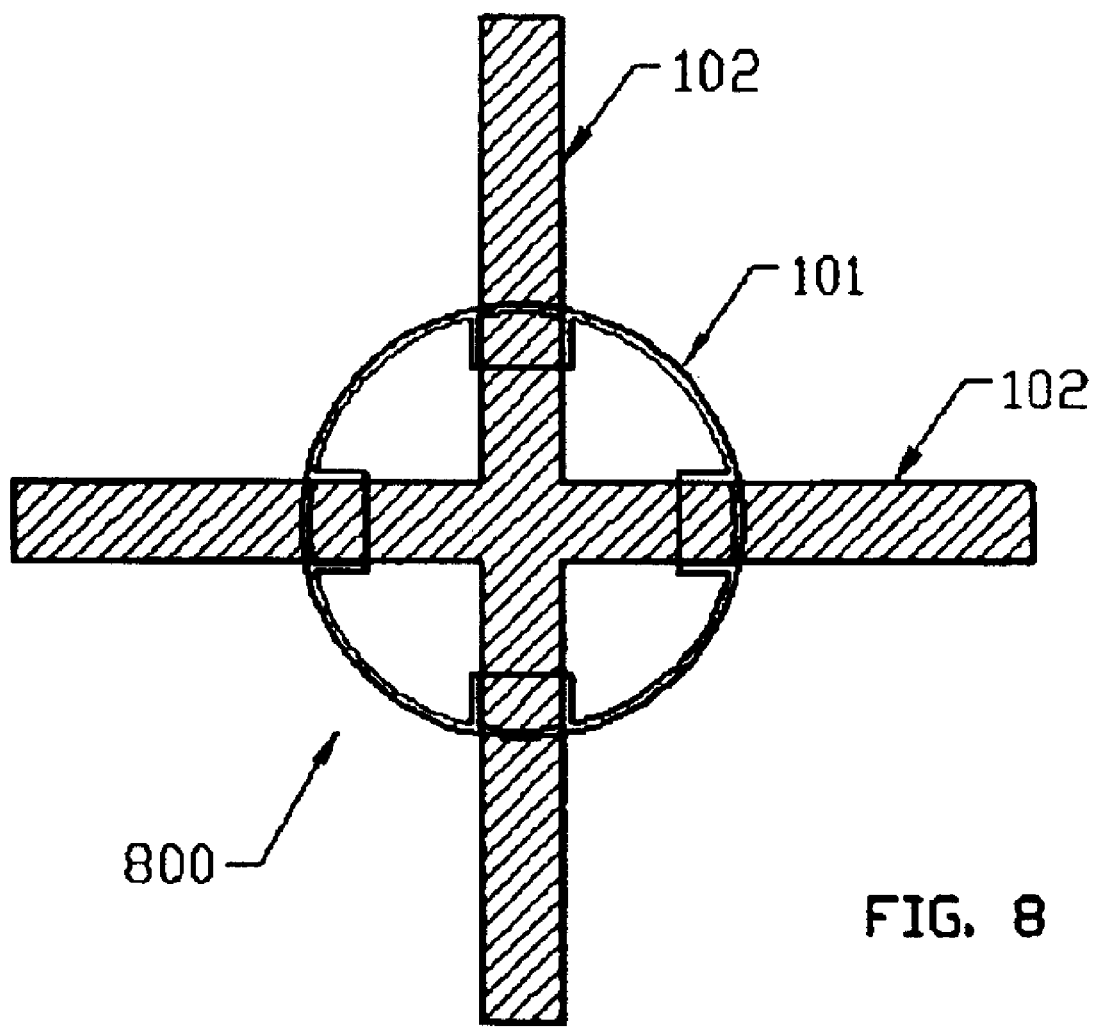
FIG. 8 is a side view of a combination squeeze toy and chew toy, wherein exist one or more orthogonally opposed toy chewable portions carried by a singular toy body portion, formed in accordance with a fourth alternative embodiment of this invention.

In a fourth alternative embodiment, a combination squeeze toy and chew toy 800, formed in accordance with the preferred embodiment of this invention, therein exist one or more orthogonally opposed toy chewable portions 102 carried by a singular toy body portion 101 as shown in FIG. 8. It will thus be seen that the objects set forth above, among those made apparent from the preceding descriptions, are efficiently attained and, since certain changes may be made in carrying out the above method and in the article set forth without departing from the spirit and scope of the invention, It is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention, which, as a matter of language, might be said to fall therebetween.

Particularly it is to be understood that in said claims, ingredients or compounds recited in the singular are intended to include compatible mixtures of such ingredients wherever the sense permits.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A combination squeeze toy and chew toy for a pet comprising of an assemblage of two different formed materials having different material properties, further comprising:
   a toy chewable portion formed of a first material having a first end, a second end and an elongated middle portion extending from the first end to the second end and a first rigidity and a first hardness, wherein said first material is substantially comprised of rigid or semi rigid thermal plastic;
   a toy body portion formed of a second material having a second rigidity, substantially less rigid than that of the first rigidity and a second hardness substantially less hard than that of the first hardness, wherein said second material is substantially comprised of soft, resiliently deformable rubber or plastic elastomer; and
   said toy body portion comprises a hollow three-dimensional form, having an inner surface, an interior space and an exterior surface; wherein said toy chewable portion is positioned centrally through said toy body portion and protruding through each side thereof, whereby said first end and said second end of said toy chewable portion are partially exposed so as to allow teeth of an animal to contact said toy chewable portion when the toy is chewed by an animal;
   an assemblage means, wherein said toy body portion will mount onto said middle portion of said toy chewable portion in such a manner whereby said toy body portion and said toy chewable portion are thus collectively united.

2. A combination squeeze toy and chew toy for a pet as set forth in claim 1, wherein: said toy body portion is a hollow form, homogeneously molded of said second material.

3. A combination squeeze toy and chew toy for a pet as set forth in claim 2, wherein: said hollow form is substantially spherical in shape.

4. A combination squeeze toy and chew toy for a pet as set forth in claim 1, wherein: said toy chewable portion is a solid form; homogeneously molded of said first material.

5. A combination squeeze toy and chew toy for a pet as set forth in claim 4, wherein: said solid form is cylindrical in shape; and said cylindrical shape having a first diameter.

6. A combination squeeze toy and chew toy for a pet as set forth in claim 4, wherein: said solid form further comprises a scented or flavored substance applied to said solid form.

7. A combination squeeze toy and chew toy for a pet as set forth in claim 1, wherein: said first hardness of said toy chewable portion is molded to have a Shore D hardness of 70 or more; and said second hardness of said toy body portion is molded to have a Shore A hardness of 90 or less.

8. A combination squeeze toy and chew toy for a pet as set forth in claim 1, wherein: said toy body portion includes a pair of inward protruding tubular sleeves integrally and centrally formed within each opposing hemisphere of said toy body portion, positioned to partially and circumferentially overlay in parallel the surface of said middle portion of said chewable toy portion; and said toy body portion and said tubular sleeves consist of homogeneously molded material.

9. A combination squeeze toy and chew toy for a pet as set forth in claim 8, wherein: said tubular sleeves having a second diameter, said second diameter being less than or substantially equal to said first diameter.

10. A combination squeeze toy and chew toy for a pet comprising of an assemblage of two different formed materials having different material properties, further comprising:
    a toy chewable portion formed of a first material having a first end, a second end and an elongated middle portion extending from the first end to the second end and a first rigidity and a first hardness, wherein said first material is substantially comprised of rigid or semi rigid thermal plastic;
    a toy body portion formed of a second material having a second rigidity, substantially less rigid than that of the first rigidity and a second hardness substantially less hard than that of the first hardness, wherein said second material is substantially comprised of soft, resiliently deformable rubber or plastic elastomer; and
    said toy body portion comprises a hollow three-dimensional form, having an inner surface, an interior space and an exterior surface; wherein said first end of said toy chewable portion is positioned onto the exterior surface of said toy body portion and protruding from one side thereof; whereby said second end of said toy chewable portion is partially exposed so as to allow teeth of an animal to contact said toy chewable portion when the toy is chewed by an animal;
    an assemblage means, wherein said first end of said toy chewable portion will mount onto the exterior surface of said toy body portion by means of a cylindrical pocket and in such as manner whereby said toy body portion and said toy chewable portion are thus collectively.

11. A combination squeeze toy and chew toy for a pet as set forth in claim 10, wherein: said toy body portion is a hollow form, homogeneously molded of said second material.

12. A combination squeeze toy and chew toy for a pet as set forth in claim 11, wherein: said hollow form is substantially spherical in shape.

13. A combination squeeze toy and chew toy for a pet as set forth in claim 10, wherein: said toy chewable portion is a solid form; homogeneously molded of said first material.

14. A combination squeeze toy and chew toy for a pets set forth in claim 13, wherein: said solid form is cylindrical in shape; and said cylindrical shape having a first diameter.

15. A combination squeeze toy and chew toy for a pet as set forth in claim 13, wherein: said solid form further comprises a scented or flavored substance applied to said solid form.

16. A combination squeeze toy and chew toy for a pet as set forth in claim 10, wherein: said first hardness of said toy chewable portion is molded to have a Shore D hardness of 70 or more; and said second hardness of said toy body portion is molded to have a Shore A hardness of 90 or less.

17. A combination squeeze toy and chew toy for a pet as set forth in claim 10, wherein: said toy body portion includes one inward protruding cylindrical pocket integrally and centrally formed within one hemisphere of said toy body portion, positioned to partially and circumferentially overlay in parallel the surface of said first end portion of said chewable toy portion; and said toy body portion and said cylindrical pocket consist of homogeneously molded material.

18. A combination squeeze toy and chew toy for a pet as set forth in claim 17, wherein: said cylindrical pocket having a second diameter, said second diameter being less than or substantially equal to said first diameter.

* * * * *